United States Patent
Faulk et al.

(10) Patent No.: US 12,245,580 B2
(45) Date of Patent: Mar. 11, 2025

(54) ANIMAL TRAP SYSTEM, METHOD AND DEVICE

(71) Applicants: Krissy Lee Faulk, Port St. Lucie, FL (US); Christopher Lee Faulk, Port St. Lucie, FL (US)

(72) Inventors: Krissy Lee Faulk, Port St. Lucie, FL (US); Christopher Lee Faulk, Port St. Lucie, FL (US)

(*) Notice: Subject to any disclaimer, the term of this patent is extended or adjusted under 35 U.S.C. 154(b) by 72 days.

(21) Appl. No.: 18/087,683

(22) Filed: Dec. 22, 2022

(65) Prior Publication Data
US 2023/0240280 A1 Aug. 3, 2023

Related U.S. Application Data

(60) Provisional application No. 63/296,707, filed on Jan. 5, 2022.

(51) Int. Cl.
*A01M 23/08* (2006.01)
*A01M 23/02* (2006.01)

(52) U.S. Cl.
CPC ............ *A01M 23/08* (2013.01); *A01M 23/02* (2013.01)

(58) Field of Classification Search
CPC ...... A01M 23/08; A01M 23/00; A01M 23/02; A01M 23/14; A01M 23/16
USPC .................. 43/58, 60, 61, 64, 65, 73, 76
See application file for complete search history.

(56) References Cited

U.S. PATENT DOCUMENTS

| | | | | |
|---|---|---|---|---|
| 109,282 A | * | 11/1870 | Williams | A01M 1/02 43/65 |
| 115,215 A | * | 5/1871 | Keep | A01M 1/103 43/121 |
| 119,435 A | * | 9/1871 | Web | A01M 1/103 43/65 |
| 376,246 A | * | 1/1888 | Kunderd | A01M 23/04 43/69 |
| 658,663 A | * | 9/1900 | Lundy | A01M 1/103 43/121 |
| 722,065 A | * | 3/1903 | Weller | A01M 21/00 43/70 |
| 1,178,851 A | * | 4/1916 | Godwin | A01M 23/08 43/66 |
| 1,823,365 A | * | 9/1931 | Kozlowski | A01M 1/106 43/118 |
| 2,054,730 A | * | 9/1936 | Pierpoint | A01M 1/103 43/121 |
| 4,157,628 A | * | 6/1979 | Saslove | A01M 23/08 43/65 |
| 4,263,740 A | * | 4/1981 | Hemsarth | A01M 1/14 43/121 |
| 5,406,741 A | * | 4/1995 | Little | A01M 23/08 43/64 |
| 5,870,853 A | * | 2/1999 | Williams | A01M 1/2005 43/132.1 |
| 2021/0378229 A1 | * | 12/2021 | Kilgore | A01M 23/08 |

* cited by examiner

*Primary Examiner* — Darren W Ark
*Assistant Examiner* — William L Gmoser (57) ABSTRACT

An animal trap apparatus, method and device for safely capturing live creatures such as lizards. The animal trap apparatus includes an open cage having a top opening, an elevated frame having support beams extending above the top opening and a bait container coupled with the support beams such that the bait container is suspended above the top opening of the open cage.

16 Claims, 6 Drawing Sheets

ANIMAL TRAP SYSTEM, METHOD AND DEVICE

CROSS-REFERENCE TO RELATED APPLICATIONS

This application claims priority to U.S. Provisional Application Ser. No. 63/296,707, filed Jan. 5, 2022, titled "ANIMAL TRAP SYSTEM, METHOD AND DEVICE", hereby incorporated by reference in its entirety for all of its teachings.

FIELD OF THE INVENTION

The invention relates to capturing systems. In particular, the invention relates to an animal trap system for attracting and capturing creatures using bait.

BACKGROUND OF INVENTION

Conventional creature traps, such as lizard traps, utilize complicated and expensive electronics, are large/unwieldly to transport and/or are designed to kill the creatures. There is a need for an apparatus for safely trapping creatures, which is portable and needs no power source. Further, there is a need for an apparatus or system for safely trapping creatures, which includes use of bait and which is relatively simple in construction.

SUMMARY OF THE INVENTION

Embodiments of the present application are directed to an animal trap system, method and device for safely capturing live creatures, such as lizards. Specifically, the animal trap system is able to comprise an open cage formed by a floor, a ceiling, one or more side walls and a top opening, wherein the sidewalls extend vertically at an acute angle between a perimeter of the flat base and a perimeter of the ceiling and the top opening is defined by an aperture in a central portion of the ceiling, an elevated frame including a plurality of support beams extending above a height of the ceiling of the open cage and a bait container coupled with at least one of the support beams of the elevated frame such that the bait container is suspended above the top opening of the open cage. As a result, the system provides the advantage of cheaply and safely capturing multiple creatures (e.g., lizards) utilizing a single trap without the need for power or complex electronics.

A first aspect of the present application is directed to an animal trap apparatus for safely capturing live creatures. The animal trap apparatus comprises an open cage formed by a floor, a ceiling, one or more side walls and a top opening, wherein the sidewalk extend vertically at an acute angle between a perimeter of the flat base and a perimeter of the ceiling and the top opening is defined by an aperture in a central portion of the ceiling, an elevated frame including a plurality of support beams extending above a height of the ceiling of the open cage and a bait container, coupled with at least one of the support beams of the elevated frame such that the bait container is suspended above the top opening of the open cage.

In some embodiments, the acute angle is 45 degrees with respect to a plane formed by the perimeter of the floor. In some embodiments, a plane formed by the perimeter of the ceiling is parallel to the plane formed by the perimeter of the floor. In some embodiments, the bait container couples with the elevated frame via one or more coupling lines. In some embodiments, the elevated frame includes one or more base beams that support the perimeter of the floor of the open cage. In some embodiments, the support beams extend vertically from the base beams. In some embodiments, the bait container includes an inner cavity for holding bait and a plurality of transparent walls that surround the inner cavity. In some embodiments, the apparatus further comprises a secondary bait container positioned within the open cage. In some embodiments, the creatures are lizards.

A second aspect is directed to a method of operating an animal trap apparatus for safely capturing live creatures. The method comprises positioning the animal trap apparatus ire a desired location having a number of creatures, wherein the animal trap apparatus comprises an open cage formed by a floor, a ceiling, one or more side walls and a top opening, wherein the sidewalls extend vertically at an acute angle between a perimeter of the flat base and a perimeter of the ceiling and the top opening is defined by an aperture in a central portion of the ceiling, an elevated frame including a plurality of support beams extending above a height of the ceding of the open cage and a bait container coupled with at least one of the support beams of the elevated frame such that the bait container is suspended above the top opening of the open cage and placing bait into the bait container.

In some embodiments, the acute angle is 45 degrees with respect to a plane formed by the perimeter of the floor. In some embodiments, a plane formed by the perimeter of the ceiling is parallel to the plane formed by the perimeter of the floor. In some embodiments, the bait container couples with the elevated frame via one or more coupling lines. In some embodiments, the elevated frame includes one or more base beams that support the perimeter of the floor of the open cage. In some embodiments, the support beams extend vertically from the base beams. In some embodiments, the bait container includes an inner cavity for holding bait and a plurality of transparent walls that surround the inner cavity. In some embodiments, the method further comprises positioning a secondary bait container positioned within the open cage and placing bait in the secondary bait container. In some embodiments, the creatures are lizards.

A third aspect is directed to an animal tap device for safety capturing live creatures. The animal trap device comprises an open cage formed by a floor, a ceiling, one or more side walls and a top opening, wherein the sidewalls extend vertically at an acute angle between a perimeter of the flat base and a perimeter of the ceiling and the top opening is defined by an aperture in a central portion of the ceiling and a bait container positioned within the open cage. In some embodiments, the acute angle is 45 degrees with respect to a plane formed by the perimeter of the floor. In some embodiments, a plane formed by the perimeter off, the ceiling is parallel to the plane formed by the perimeter of the floor. In some embodiments, the bait container includes an inner cavity for holding bait and a plurality of transparent walls that surround the inner cavity. In some embodiments, the bait container is coupled to the floor of the open cage. In some embodiments, the creatures are lizards.

DETAILED DESCRIPTION OF THE PRESENT INVENTION

Embodiments of the present application are directed to an animal trap system, method and device for safely capturing live creatures (e.g., lizards). Specifically, the creature capturing system is able to comprise an open cage formed by a floor, a ceiling, one or more side walls and a top opening, wherein the sidewalls extend vertically at an acute angle between a perimeter of the flat base and a perimeter of the ceiling and the top opening is defined by an aperture in a central portion of the ceiling, an elevated frame including a plurality of support beams extending above a height of the ceiling of the open cage and a bait container coupled with at least one of the support beams of the elevated frame such that the bait container is suspended above the top opening of the open cage. As a result, the system provides the advantage of cheaply and safely capturing multiple creatures (e.g., lizards) utilizing a single trap without the need for power or complex electronics. It should be noted that although the description below is with respect to capturing lizards, other types of creatures are able to be captured using the apparatus 100 in the same manner.

Figure 1A:
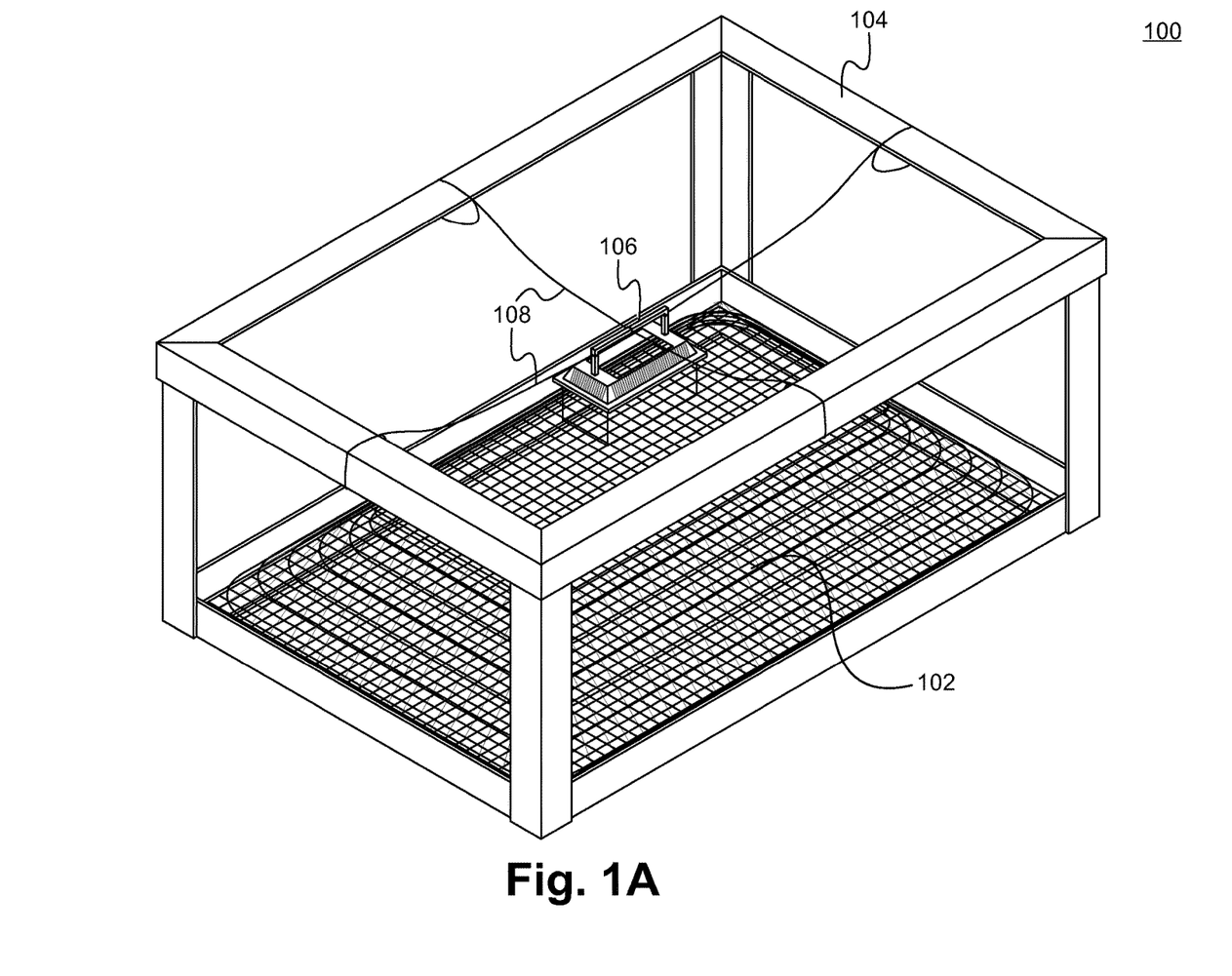
FIG. 1A illustrates a perspective view of an animal trap apparatus according to some embodiments.
Figure 1B:
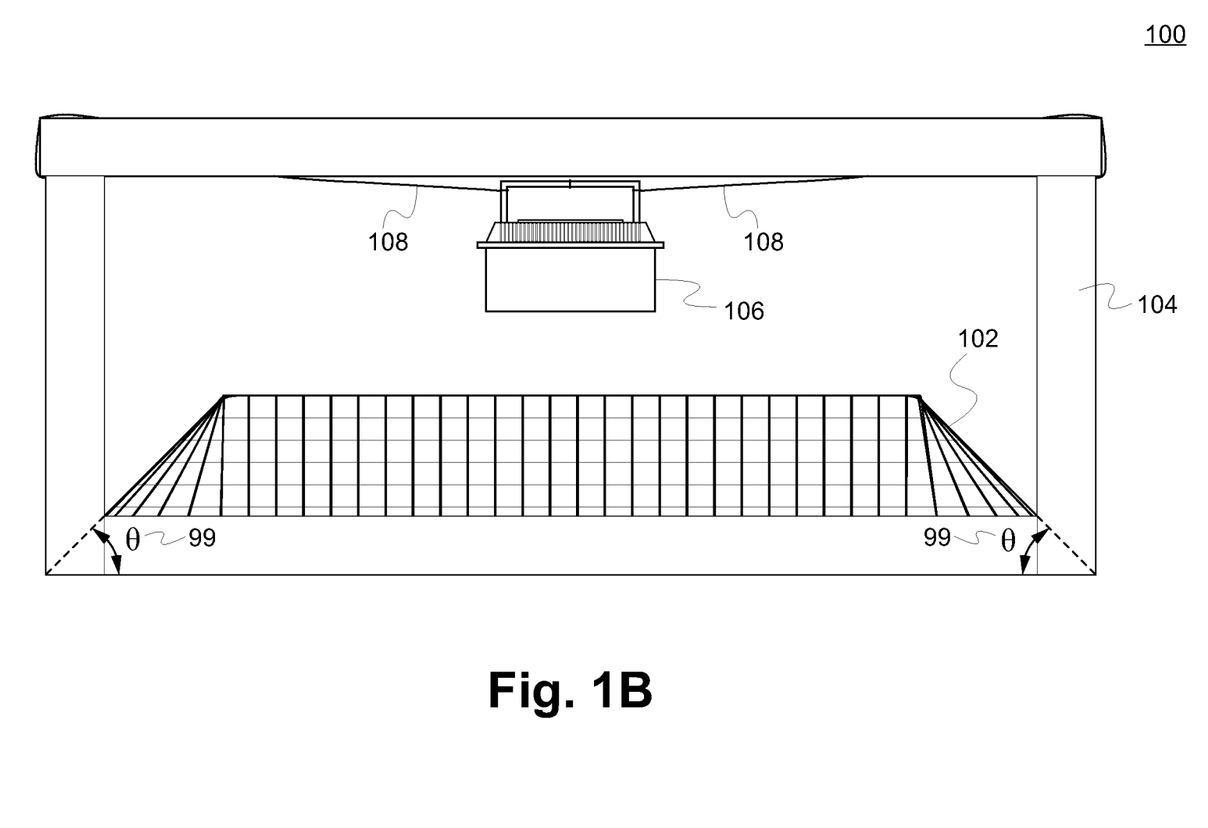
FIG. 1B illustrates a front view of the animal trap apparatus according to some embodiments.
Figure 1C:
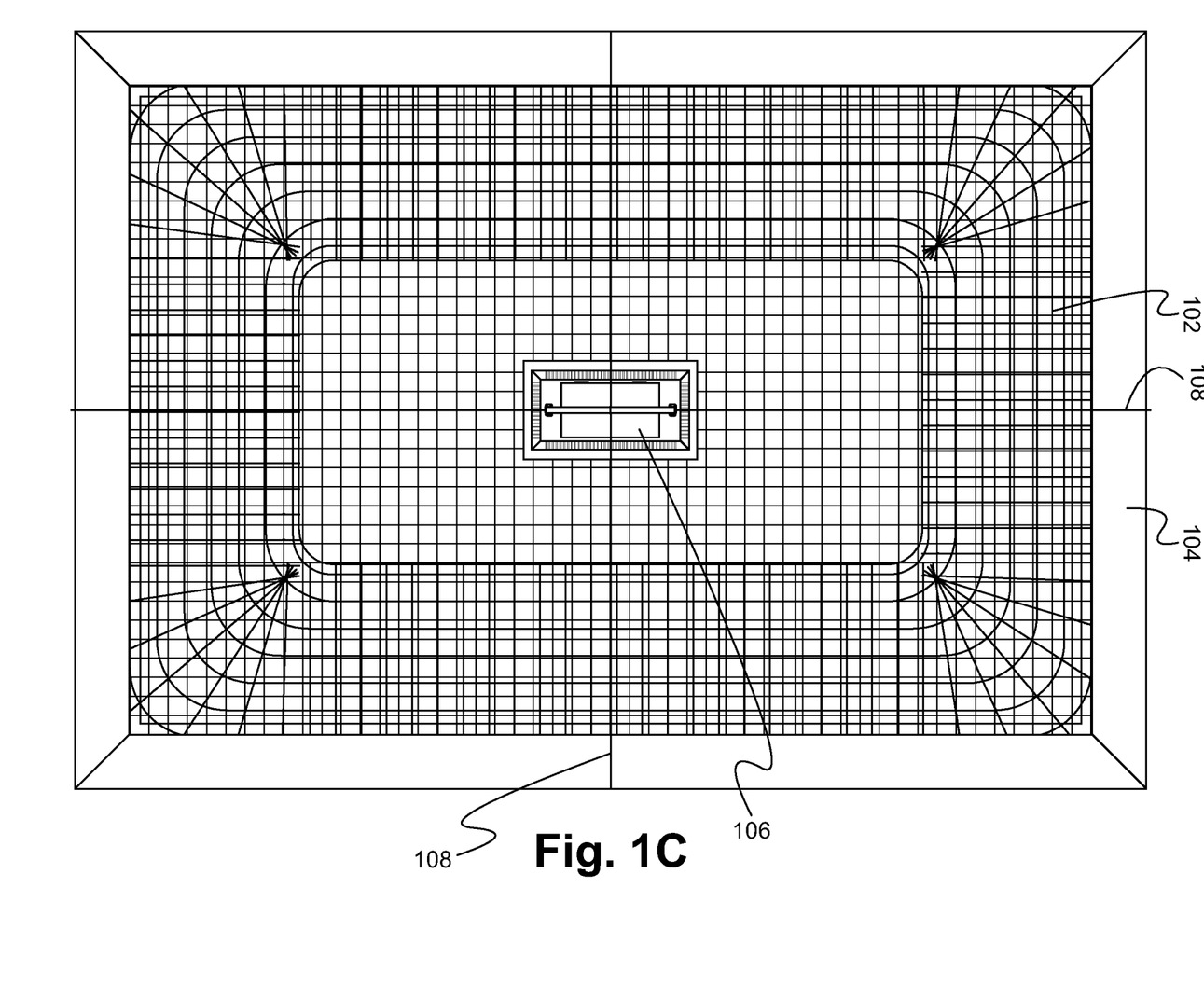
FIG. 1C illustrates a top view of the animal trap apparatus according to some embodiments.

FIGS. 1A-1C illustrate a perspective, front and top views, respectively, of an animal trap apparatus 100 according to some embodiments. As shown in FIGS. 1A-1C, the animal trap apparatus 100 comprises an enclosure or cage 102, a frame 104, a bait container 106 and one or more coupling lines 108 for coupling the bait container 106 to the frame 104. In some embodiments, the apparatus 100 includes one or more additional bait containers 106' for positioning within the enclosure 102. In some embodiments, as described in detail below, some or all of the frame 104 and/or coupling lines 108 are able to be omitted.

Figure 2:
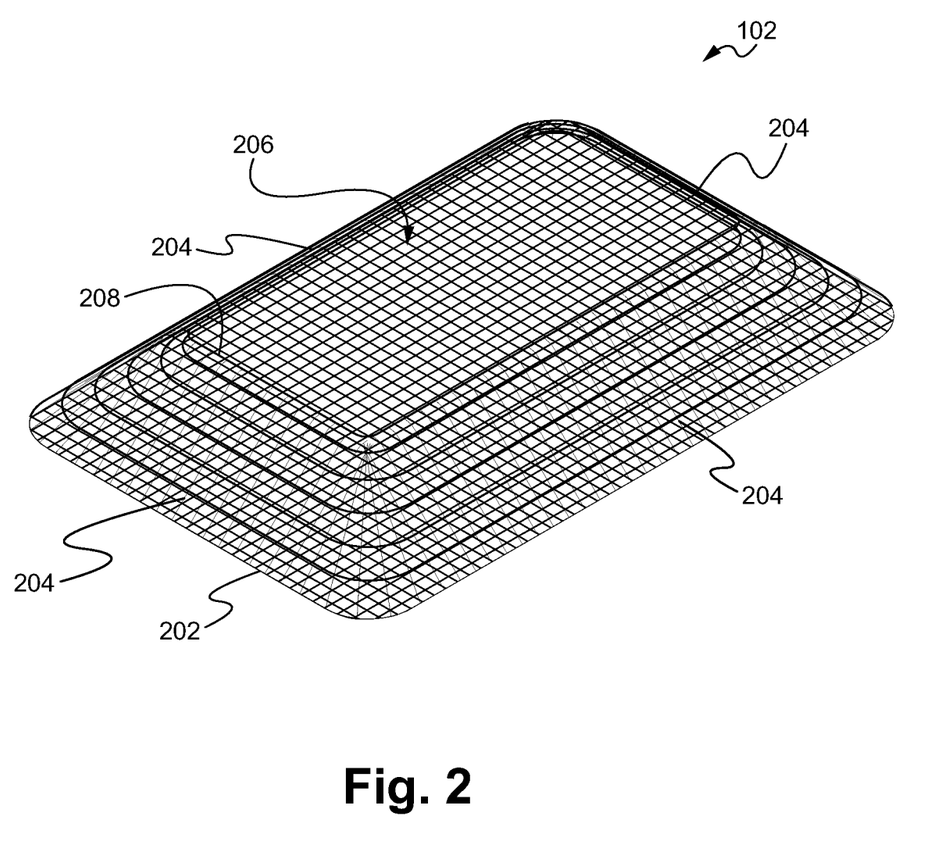
FIG. 2 illustrates a perspective view of the animal trap apparatus enclosure according to some embodiments.

FIG. 2 illustrates a perspective view of the enclosure 102 according to some embodiments. As shown in FIG. 2, the enclosure comprises a floor 202, a ceiling 208 having a top opening 206 and a plurality of side walls 204 extending upward from the floor 202 to the ceiling 208 at an angle 99 (see FIG. 1B). In some embodiments, the angle 99 is able to be between 40 and 50 degrees (e.g., 45 degrees) in order to enable the lizards to easily climb the outside of the enclosure 102, but not scale the inside of the enclosure 102 or jump out of the enclosure 102. In some embodiments, the length of the side walls 204 is 10 to 12 inches (e.g. 11 inches) and the depth of the enclosure 102 between the floor 202 and the ceiling 208 is 7 to 8.5 inches (e.g. 8 inches) in order to enable the lizards to climb the side walls 204, but also prevent the lizards from escaping the inside of the enclosure 102. Alternatively, the length of the side walls 204 is 7 to 15 inches and/or the depth of the enclosure 102 between the floor 202 and the ceiling 208 is 5 to 10.5 inches (e.g., 8 inches) in order to enable the lizards to climb the side walls 204, but also prevent the lizards from escaping the inside of the enclosure 102.

In some embodiments, the side walls 204, ceiling 208 and/or floor 202 of the enclosure 102 are formed by a grid of (metal, plastic and/or wooden) bars such that the enclosure 102 is a cage. In such embodiments, the gaps in the grid are able to be smaller than the size of a creature such as a lizard. For example, the gaps in the grid are able to be 1 cm by 1 cm or smaller. Alternatively, the gaps in the grid are able to be 5 cm by 5 cm or smaller. Alternatively, one or more of the side walls 204, ceiling 208 and/or floor 202 of the enclosure 102 are able to be formed by plastic, metal and/or wood sheets. In such embodiments, the sheets are able to have one or more holes (that are smaller than the size of a creature (e.g., lizard)) to facilitate the climbing, by the lizards and/or viewing of the lizards within the enclosure 102. Alternatively, or in addition, the sheets are able to be continuous such that they do not have holes/gaps. In such embodiments, the material forming one or more of the sheets is able to be partially or fully transparent such that the captured lizards are able to be viewed, within the enclosure 102 and the lizards are able to view any bait positioned within the enclosure.

Although as shown in FIG. 2, the floor 202, ceiling 208 and/or top opening 206 have a rectangular perimeter, different shaped perimeters are able to be used (e.g., circular, ovular, square, triangular, or any other shape). Further, although as shown in FIG. 2 the perimeters of the floor 202, ceiling 208 and/or top opening 206 are the same, two or more of the floor 202, ceiling 208 and/or top opening 206 are able to have differently shaped perimeters. In particular, the top opening 206 is able to have a differently shaped perimeter to that of the ceiling 208 and/or floor 202 in order to ensure the lizards cannot reach the bait container 106. For example, the top opening 206 is able to have a perimeter that matches the bottom perimeter of the bait container 106 to ensure that the lizards are kept an equal distance from the bottom of the bait container 106 regardless of which side of the top opening 206 they are on. In some embodiments, the junction between one or more of the side walls 204 and/or between the side walls 204 and the ceiling 208 is able to be rounded such that those walls form a seamless ramp from the floor 202 to the ceiling 208 and/or top opening 206.

In some embodiments, the enclosure 102 is able to comprise an inward lip (not shown) that extends from the entire perimeter of the top opening 206 into the cavity of the enclosure 102 in order to block/hinder the lizards from being able to climb the inside of the enclosure 102 and back out of the top opening 206. For example, the inward lip is able to extend in a direction perpendicular to the ceiling 208 (e.g., downward) into the cavity. Alternatively, the inward lip is able to extend at an acute angle with respect to the ceiling 208 such that it points in a direction away from the middle of the enclosure. In some embodiments, the floating edge of the inward lip is able to be sharp, serrated and/or pointed (e.g., having sharpened bar tips or a sharpened sheet edge) in order to further deter climbing over the lip. In some embodiments, the length of the lip as measured from the perimeter of the top opening 206 is less than or equal to a fifth of the height of the enclosure 102 (e.g., the distance between the floor 202 and the ceiling 208). Alternatively, the lip is able to be omitted.

Figure 3:
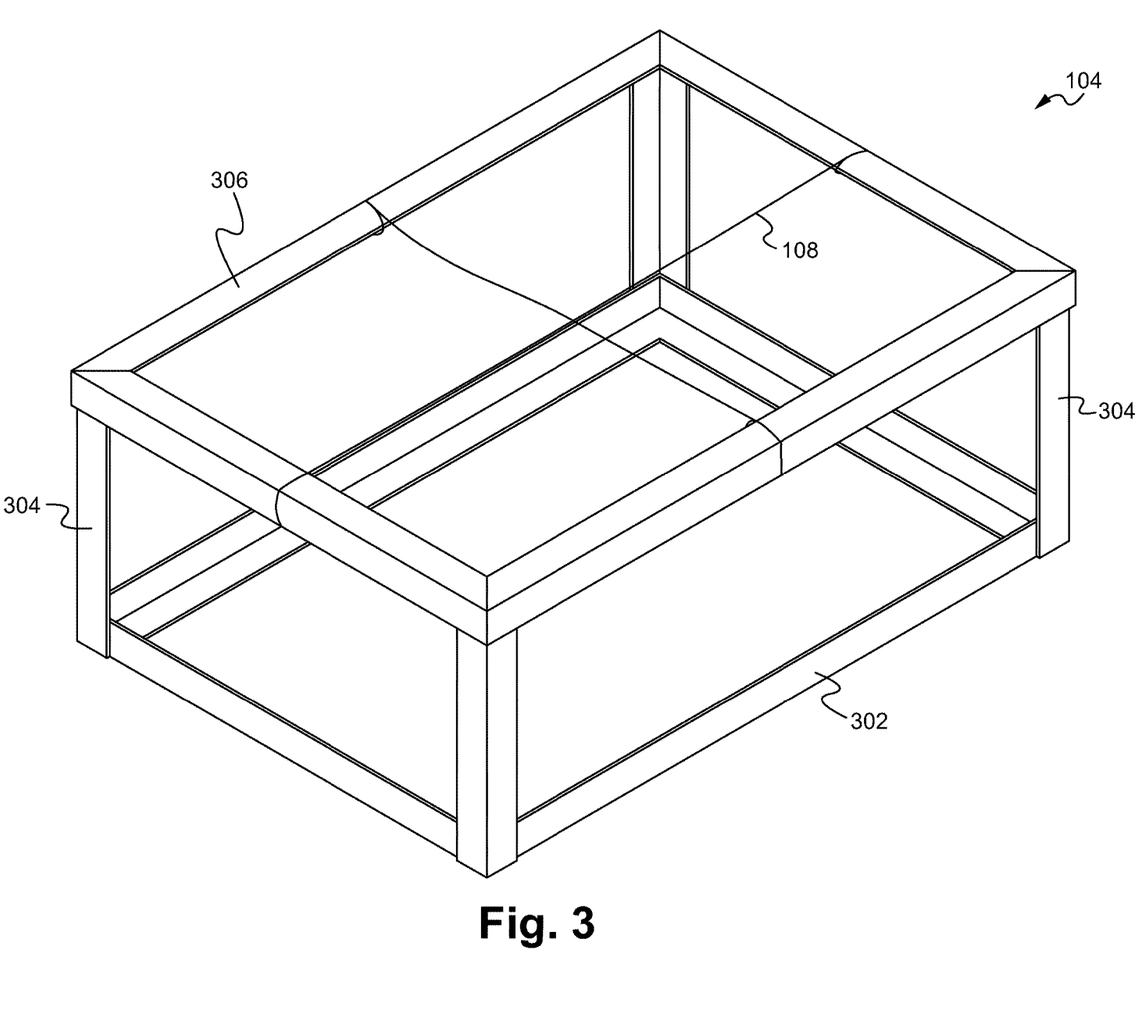
FIG. 3 illustrates a perspective view of the animal trap apparatus frame according to some embodiments.

FIG. 3 illustrates a perspective view of the frame 104 according to some embodiments. As shown in FIG. 3, the frame 104 comprises a base formed by a plurality of base support beams 302, one or more elevated beams 306 and one or more vertical beams 304 extending up from the base and coupling the base beams 302 with the elevated beams 306. Although as shown in FIG. 3, the frame 104 comprises four base beams 302, four vertical beams 304 and four elevated beams 306 forming a rectangular prism, more or less base, vertical and/or elevated beams are able to be used and the frame 104 is able to form other shapes (e.g., cylinder, triangular prism, or other shape). In some embodiments, the frame 104 is 30 inches wide, 24 inches deep and 18 inches tall. Alternatively, the frame 104 is able to have other dimensions.

In some embodiments, the size and shape of the base of the frame 104 substantially matches the size and shape of the floor 202 of the enclosure 302 (e.g., slightly larger such that the enclosure 102 fits within the base of the frame 104). The base of the frame 104 is able to have bottom and/or lips that support and/or couple to the bottom and perimeter of the floor 202 of the enclosure 102 to hold the enclosure in place within the frame 104. Alternatively, the base of the frame 104 is able to be omitted and the frame 104 is able to be positioned around and/or above the enclosure 102 with the elevated beams 306 being supported by the vertical beams 304. In such embodiments, the vertical beams 304 are able to be coupled to or not coupled to the enclosure 102. For example, the vertical beams 304 are able to be coupled to one or more points of the perimeter of the floor 202 of the enclosure 102, coupled to the side walls 204 and/or ceiling 208 of the enclosure 102 (and extending upward therefrom), or a combination thereof. Additionally, as shown, in FIG. 3, the elevated beams 306 are able to comprise one or more coupling lines 108 for coupling the bait container 106 such that it is suspended over the top opening 206. Alternatively, one or more of the lines 108 are able to be replaced or supplemented with elevated beams 306 that extend above the top opening 206 and coupled to the bait container 106 such that the elevated beams 306 directly support the bait container 106 over the top opening 206.

Figure 4:
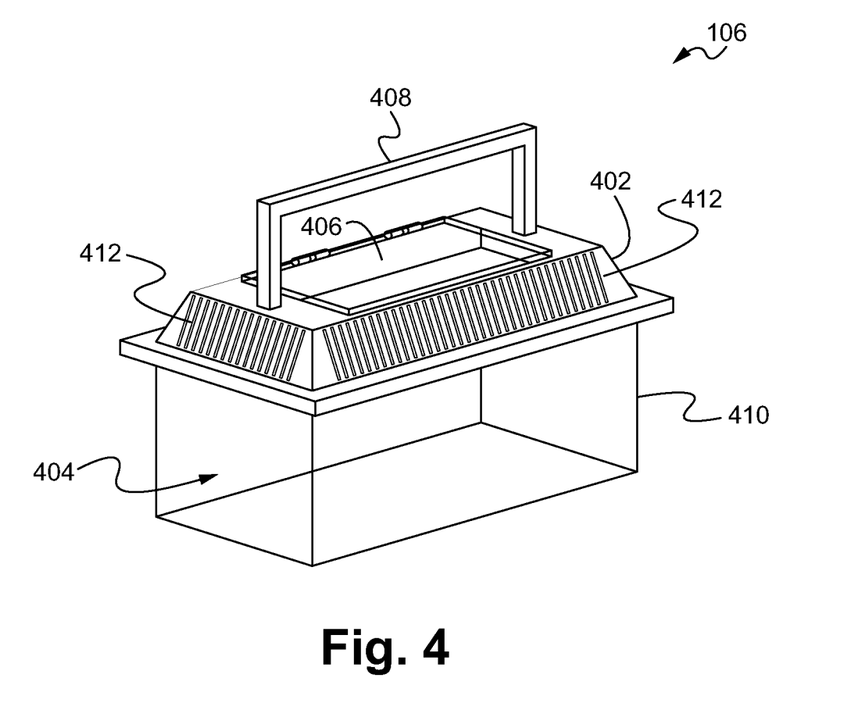
FIG. 4 illustrates a perspective view of the bait container according to some embodiments.

FIG. 4 illustrates a perspective view of the bait container 106 according to some embodiments. As shown in FIG. 4, the bait container is able to have a rigid body 402 that forms a housing around an inner cavity 404 for receiving the bait. The body 402 is able to include a top access door 406 that when opened provides access to the inner cavity 404 and then is able to be closed to prevent the bait from escaping. Further, body 402 of the bait container 106 is able to comprise a handle 408 for coupling to the frame 104 (and holding the container 106), one or more transparent walls 410 and/or air holes 412 that enable the bait to be viewed, heard and/or smelled from within the bait container 106.

As shown in FIGS. 1A-1C, the enclosure 102 is able to be positioned within the frame 104 and the coupling lines 108 are able to couple the bait container 106 to the elevated beams 306 of the frame 104 such that the bait container 106 is suspended above a top opening 206 of the enclosure 102. In some embodiments, the bottom of the bait container 106 is 2 to 4 inches (e.g., 3 inches) higher than the ceiling 20 of the enclosure 102 and/or a lateral distance between an outer perimeter of the bottom of the bait container 106 and the perimeter of the top opening 206 is 2 to 4 inches (e.g., 3 inches). Alternatively, the bottom of the bait container 106 is able to be 1 to 10 inches higher than the ceiling 208 of the enclosure 102 and/or a lateral distance between an outer perimeter of the bottom of the bait container 108 and the perimeter of the top opening 206 is able to be 1 to 10 inches. Alternatively, the coupling lines 108 are able to be omitted and one or more of the elevated support beams 306 are able to protrude over the enclosure 102 and/or top opening 206 such that the bait container 106 is able to couple directly to the elevated beams in order to be suspended over the top opening 206. As described above, the base beams 302 of the frame 104 is able to support at least a portion of the bottom and or perimeter of the floor 202 of the enclosure 102 such that the enclosure 102 moves with the frame 104.

In some embodiments, the enclosure 102 is able to be coupled to the frame 104 (e.g., welded, glued, or otherwise affixed) and/or is able to fit snugly on top of the bottom of the base beams 302 and/or within the vertical beams 104 and/or within a perimeter lip of the base beams 302. Alternatively, the coupling lines 108, the vertical beams 304, the elevated beams 306 and/or the entire frame 104 are able to be omitted and the bait container 106 is able to be positioned and/or coupled the floor 202 of the enclosure 102. In such embodiments, the bait container 106 is able to be positioned within the enclosure 102 (and/or coupled to the floor 202 of the enclosure 102) such that it is beneath the top opening 206 of the enclosure.

In operation, the enclosure 102 and frame 104 are able to be positioned in a desired location. After the bait container 106 is filled with bait and suspended over the top opening 206 (e.g., via the coupling lines 108), lizards scale the side walls 204 of the enclosure 102 and fall into the top opening 206 as they attempt to catch the bait. The lizards are then unable to escape the enclosure 102 due to the angle 99 of the side walls 204 with respect to the floor 202 of the enclosure. In some embodiments where the frame 104 is omitted, the enclosure 102 is able to be placed in the desired location with the bait container 106 positioned within and/or coupled to the floor 202 of the enclosure 102 (e.g., below the top opening 206). Then, again, after the bait container 106 is filled with bait, lizards scale the side walls 204 of the enclosure 102 and fall into the top opening 206 as they attempt to catch the bait.

Figure 5:
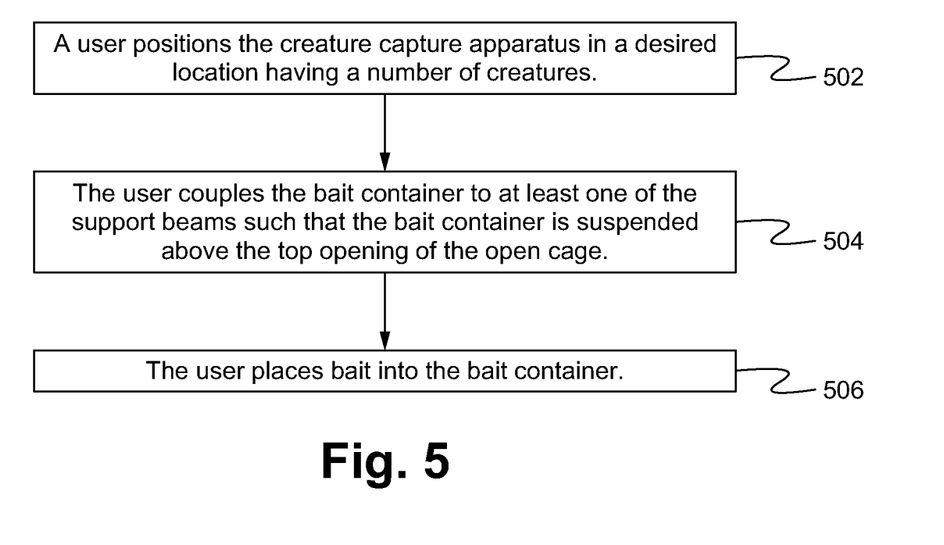
FIG. 5 illustrates a method of using an animal trap apparatus according to some embodiments.

FIG. 5 illustrates a method of operating an animal trap apparatus for safely capturing live creatures (e.g., lizards) according to some embodiments. As shown in FIG. 5, a user positions the animal trap apparatus in a desired location having a number of creatures at the step 502. The user couples the bait container to at least one of the support beams such that the bait container is suspended above the top opening of the open cage at the step 504. The user places bait into the bait container at the step 506. In some embodiments, the method further comprises positioning a secondary bait container positioned within the open cage and placing bait in the secondary bait container. As a result, the method provides the advantage of enabling the animal trap apparatus to be easily moved into various desired positions for attracting and capturing multiple live creatures such as lizards.

Thus, it is clear that the animal trap apparatus, method and device described herein has numerous advantages. Specifically, the animal trap system 100 is able to comprise an open cage formed by a floor, a ceiling, one or more side walls and a top opening, wherein the sidewalls extend vertically at an acute angle between a perimeter of the flat base and a perimeter of the ceiling and the top opening is defined by an aperture in a central portion of the ceiling, an elevated frame including a plurality of support beams extending above a height of the ceiling of the open cage and a bait container coupled with at least one of the support beams of the elevated frame such that the bait container is suspended above the top opening of the open cage. As a result, the system provides the advantage of cheaply and safely capturing multiple creatures, such as lizards, utilizing a single trap without the need for power or complex electronics.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications are able to be made in the embodiment chosen for illustration without departing from the spirit and scope of the invention. For example, although angles ranging from 40 to 50 (e.g., 45) degrees are described herein as they relate to being parallel with the ground or the base of the frame and/or floor of the cage other angles are able to be used (e.g. 25 to 65). Further, again, although the apparatus, method and device are described herein with respect to capturing lizards, the capturing of other types of small animals is contemplated.

What is claimed is:

1. An animal trap apparatus for safely capturing live creatures, the animal trap apparatus comprising:
    an open cage formed by a floor, four side walls and a top opening, wherein a perimeter of the top opening is entirely defined by a top edge of each side wall, wherein each side walls extends vertically at an acute angle between a perimeter of the floor and the perimeter of the top opening, forming a seamless ramp from the floor to the top opening;
    an elevated frame including a plurality of support beams extending above a height of the top opening of the open cage; and
    a bait container coupled with at least one of the support beams of the elevated frame such that the bait container is suspended above the top opening of the open cage.

2. The apparatus of claim 1, wherein the acute angle is 45 degrees with respect to a plane formed by the perimeter of the floor.

3. The apparatus of claim 2, wherein a plane formed by the perimeter of the top opening is parallel to the plane formed by the perimeter of the floor.

4. The apparatus of claim 3, wherein the bait container couples with the elevated frame via one or more coupling lines.

5. The apparatus of claim 4, wherein the elevated frame includes one or more base beams that support the perimeter of the floor of the open cage, and wherein the plurality of support beams extend vertically from the base beams.

6. The apparatus of claim 5, wherein the bait container includes an inner cavity for holding bait and a plurality of transparent walls that surround the inner cavity.

7. The apparatus of claim 6, further comprising a secondary bait container positioned within the open cage.

8. The apparatus of claim 7, wherein the creatures are lizards.

9. A method of operating an animal trap apparatus for safely capturing live creatures, the method comprising:
    positioning the animal trap apparatus in a desired location having a number of creatures, wherein the animal trap apparatus comprises an open cage formed by a floor, four side walls and a top opening, wherein a perimeter of the top opening is entirely defined by a top edge of each side wall, wherein each side walls extends vertically at an acute angle between a perimeter of the floor and the perimeter of the top opening, forming a seamless ramp from the floor to the top opening, an elevated frame including a plurality of support beams extending above a height of the top opening of the open cage and a bait container coupled with at least one of the support beams of the elevated frame such that the bait container is suspended above the top opening of the open cage; and
    placing bait into the bait container.

10. The method of claim 9, wherein the acute angle is 45 degrees with respect to a plane formed by the perimeter of the floor.

11. The method of claim 10, wherein a plane formed by the perimeter of the top opening is parallel to the plane formed by the perimeter of the floor.

12. The method of claim 11, wherein the bait container couples with the elevated frame via one or more coupling lines.

13. The method of claim 12, wherein the elevated frame includes one or more base beams that support the perimeter of the floor of the open cage, and wherein the plurality of support beams extend vertically from the base beams.

14. The method of claim 13, wherein the bait container includes an inner cavity for holding bait and a plurality of transparent walls that surround the inner cavity.

15. The method of claim 14, further comprising positioning a secondary bait container positioned within the open cage and placing bait in the secondary bait container.

16. The method of claim 15, wherein the creatures are lizards.

* * * * *